US008498963B2

(12) United States Patent
Chen et al.

(10) Patent No.: US 8,498,963 B2
(45) Date of Patent: Jul. 30, 2013

(54) METHOD AND SYSTEM FOR DATA SYNCHRONIZATION

(75) Inventors: Shi Ran Chen, Beijing (CN); Fang Bj Nan, Beijing (CN); Fei Peng Wang, Beijing (CN); Yu Yy Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/014,550

(22) Filed: Jan. 26, 2011

(65) Prior Publication Data
US 2011/0191292 A1    Aug. 4, 2011

(30) Foreign Application Priority Data

Jan. 29, 2010    (CN) .......................... 2010 1 0104993

(51) Int. Cl.
*G06F 17/30*    (2006.01)
(52) U.S. Cl.
USPC .......................................... 707/622; 707/621
(58) Field of Classification Search
USPC .......................... 707/610, 620–622
See application file for complete search history.

(56) References Cited

U.S. PATENT DOCUMENTS

| 7,317,907 | B2 | 1/2008 | Linkert et al. | |
|---|---|---|---|---|
| 7,370,270 | B2 | 5/2008 | Feng | |
| 7,853,676 | B1* | 12/2010 | Freskos et al. | 709/223 |
| 2003/0195951 | A1* | 10/2003 | Wittel et al. | 709/220 |
| 2006/0004781 | A1* | 1/2006 | Burgel et al. | 707/100 |
| 2006/0277224 | A1* | 12/2006 | Aftab et al. | 707/201 |
| 2008/0082560 | A1 | 4/2008 | Agrawal et al. | |
| 2009/0217312 | A1 | 8/2009 | Banik et al. | |

FOREIGN PATENT DOCUMENTS

| CN | 1625878 | 6/2005 |
|---|---|---|
| CN | 101256522 A | 9/2008 |

OTHER PUBLICATIONS

Chinese Office Action, dated Apr. 1, 2013.

* cited by examiner

*Primary Examiner* — Monica Pyo
(74) *Attorney, Agent, or Firm* — Shimokaji & Assoc., P.C.

(57) ABSTRACT

A method, system and computer program product for performing data synchronization by a terminal device, including receiving compatibility information between different versions of data schemas; performing compatibility verification on data by utilizing the received compatibility information between different versions of data schemas; and sending data that successfully passes through compatibility verification.

19 Claims, 4 Drawing Sheets

METHOD AND SYSTEM FOR DATA SYNCHRONIZATION

TECHNICAL FIELD OF THE INVENTION

The present invention relates to computer networks; in particular, the present invention relates to a method, system and computer program product for data synchronization.

BACKGROUND OF THE INVENTION

As computer networks have grown rapidly, data synchronization has grown rapidly in many fields such as healthcare, telecom, retail, etc. Using data synchronization technology enables an enterprise application and data to be securely sent to a terminal device via a computer network. The terminal device can always keep in synchronization with data in a central database of an enterprise via a synchronization server.

A typical technology of data synchronization is synchronization markup language (SyncML), whereby data may be synchronized in various types of devices such as a terminal device of a user or a central database of an enterprise, using synchronization markup language. The user may also utilize different devices to access and process the same data. Using synchronization markup language, the user may synchronize the modification of a local copy of source data in his terminal device to the central database of the enterprise located in a network via a synchronization server at any time, and the central database may also synchronize the latest copy of source data to the terminal device via a synchronization server at any time. Since data synchronization technology enables the user of a terminal device to access the required information at any time and location without limitation, the efficiency of the mobile task is significantly improved.

However, as service requirements change, data schema of data may evolve. For instance, data schema of electronic case history records in the healthcare field may gradually evolve with changes in industry standards. New data schema produced thereby may not be compatible with the original data schema. When data synchronization is performed, such non-compatibility may cause problems. For instance, since data schema is evolved, the data schema used by the local copy of source data in the terminal device may not be compatible with the data schema used by source data in the central database, such that the modification to the local copy of source data submitted by the terminal device via the synchronization server will not be correctly applied into source data in the central database.

SUMMARY OF THE INVENTION

An exemplary embodiment of the invention recognizes the deficiencies in the prior art, and a method, system and computer program product for data synchronization are provided that enable a terminal device to perform compatibility verification on its modification of a local copy of source data before submitting the modification to a synchronization server; in this regard, the synchronization server receives data that successfully passes through compatibility verification, thereby correctly applying source data in the central database.

An exemplary embodiment provides a method for performing data synchronization by a terminal device, including: receiving compatibility information between different versions of data schemas; performing compatibility verification on data by utilizing received compatibility information between the different versions of data schemas; and sending data that successfully passes through compatibility verification.

Another exemplary embodiment provides a computer program product for data synchronization, the computer program product comprising: a computer readable storage medium having computer readable program code embodied therewith, the computer readable program code comprising: computer readable program code configured to receive compatibility information between different versions of data schemas; computer readable program code configured to perform compatibility verification on data by utilizing received compatibility information between the different versions of data schemas; and computer readable program code configured to send data that successfully passes through compatibility verification.

Still another exemplary embodiment provides an apparatus for performing data synchronization by a terminal device, including: a receiving unit for receiving compatibility information between different versions of data schemas; a verifying unit for performing compatibility verification on data by utilizing received compatibility information between different versions of data schemas; and a sending unit for sending data that successfully passes through compatibility verification.

BRIEF DESCRIPTION OF THE DRAWINGS

The disclosure may be better understood with reference to the description and by reference to the drawings, in which the same or similar reference numbers are used to indicate the same or similar elements throughout the drawings. The drawings, which are incorporated in and constitute part of this specification, illustrate preferred embodiments of the disclosure and together with the description, serve to explain the principles and benefits of the disclosure. In the drawings.

DETAILED DESCRIPTION OF THE PREFERRED EMBODIMENTS

Figure 1:
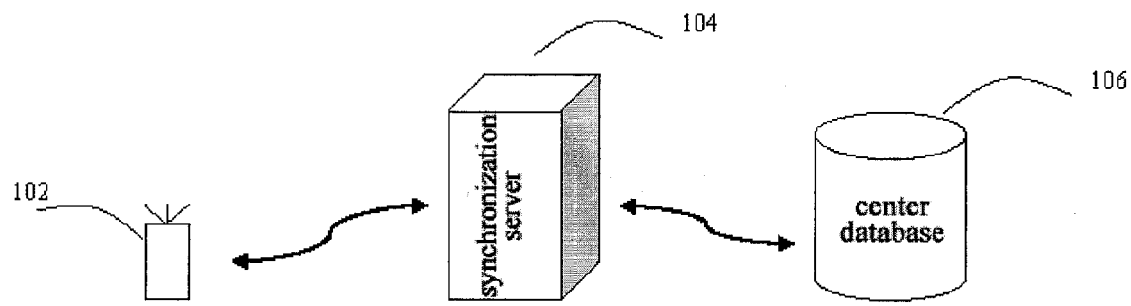
FIG. 1 shows an illustrative computer network 100 implementing a method of the disclosure.

The exemplary embodiments will be described by reference to the drawings below. For clarity and simplicity, not all features of actual embodiments are described in the description. However, it will be appreciated that many decisions specific to the actual embodiment will be necessarily made during development of any of these actual embodiments so as to attain the specific objects of the developers; for instance, limits or conditions about a system and service may change with different embodiments. Also, it will be appreciated that, for those skilled in the art, although such development tasks may be very complex and time-consuming, such developments are only routine tasks.

In this regard, it should be noted that, in order to avoid obscuring the description by unnecessary details, only apparatus structures and/or process steps that are closely related to the solution of the disclosure are shown in the drawings, and other details that are not closely related to the disclosure are omitted.

With reference to FIG. 1, a computer network 100 implementing a method of this invention is illustratively shown. The computer network 100 comprises terminal device 102, synchronization server 104, and central database 106. The terminal device 102 has a database, and performs data synchronization via synchronization server 104 to maintain a local copy consistent with source data in central database 106. When a user modifies the local copy of source data in terminal device 102, data synchronization is performed by synchronization server 104 to synchronize these modifications to central database 106. Below, an exemplary description is provided by means of extensible markup language XML, although those skilled in the art will appreciate that the invention may be adapted to any other data suitable to perform data synchronization.

Figure 2:
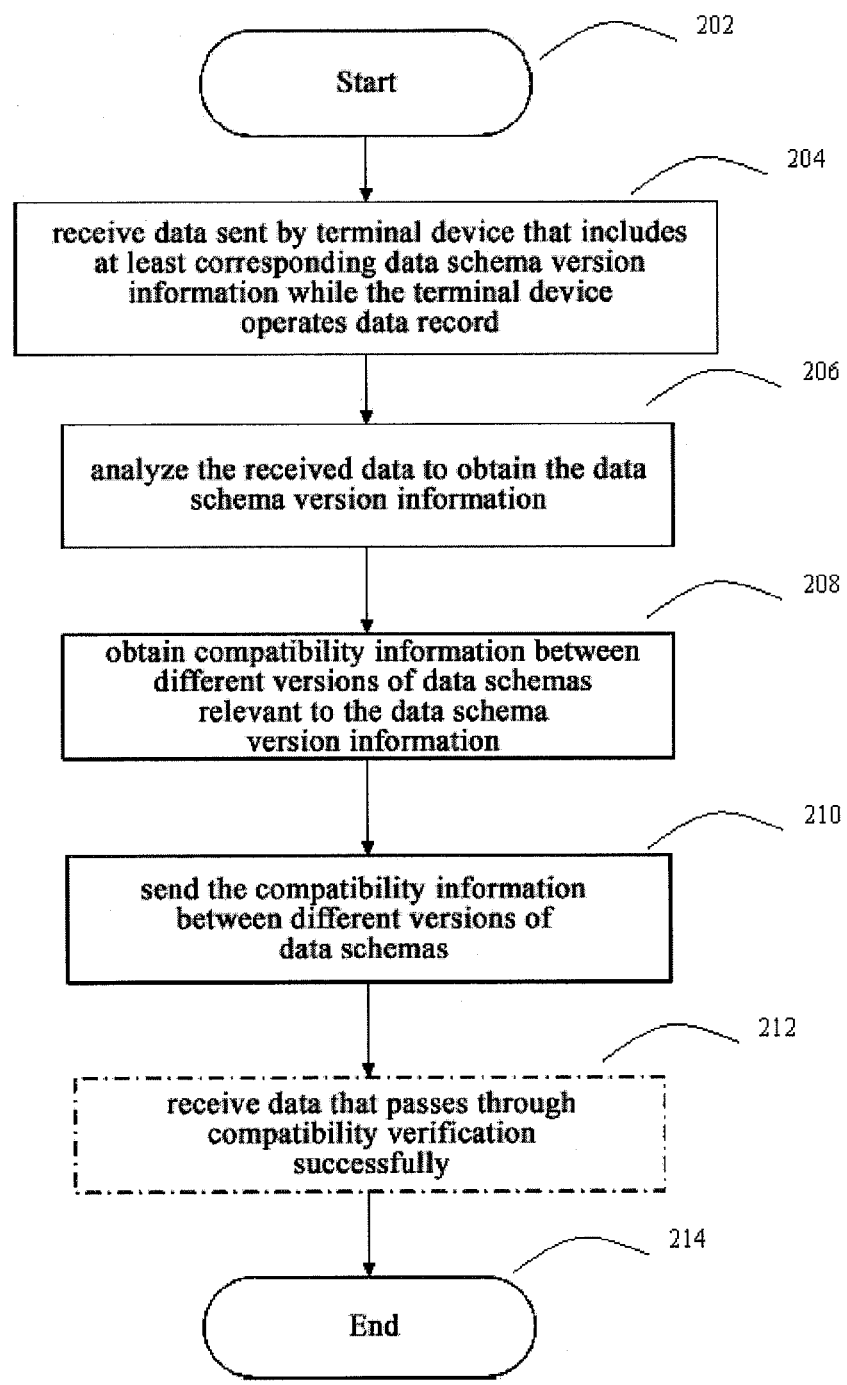
FIG. 2 shows a method 200 for data synchronization according to an embodiment of the disclosure.

With reference to FIG. 2, a method 200 for data synchronization according to an embodiment of the invention is shown. Typically, the method 200 for data synchronization is performed in a synchronization server. With reference to FIG. 2, method 200 begins at step 202. Next, in step 204, data, sent by a terminal device that includes at least corresponding data schema version information while the terminal device processes data record, is received. Such data includes at least corresponding data schema version information while the terminal device processes the data record. For instance, such data may only include corresponding data schema version information while the terminal device processes the data record. Also, it may include the result of a modification to a local copy of source data located in the terminal device by a user of the terminal device, which includes the processing with respect to the data record; it may possibly include the addition or deletion of the data record, or modification to a value of the data record, and corresponding data schema version information while the terminal device processes the data record.

Next, method 200 proceeds to step 206, in which the received data is analyzed to obtain the data schema version information. As described, data sent by the terminal device includes at least the corresponding data schema version information while the data record is processed; thus the version information of such data schemas can be obtained by analyzing such data.

Next, in step 208, compatibility information between different versions of data schemas relevant to the data schema version information is obtained. The compatibility information between different versions of data schemas includes at least the compatibility information between a current version of a data schema and a previous version of the data schema in the synchronization server. The version of the corresponding data schema may be obtained through the data schema version information obtained in step 206, and the compatibility information between different versions of data schemas relevant to the data schema version information can be further obtained, in which the compatibility information between different versions of data schemas includes at least the compatibility information between the current version of a data schema and the previous version of the data schema in the synchronization server. Then, in step 210, the compatibility information between different versions of data schemas is sent. Generally, data schema of data may have different versions, and the data schema between different versions may not be compatible. The synchronization server records and maintains compatibility information between data schemas. This compatibility information may include compatibility information between different versions of data schemas that belong to the same data schema. Optionally, only compatibility information between a latest version of data schema and other versions of data schema that belong to the same data schema is included. The data schema is a combination of a series of data schemas, which includes a historic version of data schema from a latest version of evolvement to a latest version of data schema. For instance, data schema version information obtained by analyzing data sent by the terminal device shows that corresponding data schema version information, while the data record is processed, is 1.1; and then it is concluded that the data schema relevant to version 1.1 of the data schema is version 1.0, 1.1, 1.2 and 1.3 of the data schema, and compatibility information between these data schemas, i.e., compatibility information between versions 1.0, 1.1, 1.2 and 1.3 of the data schemas, is obtained. Optionally, since the latest version is 1.3, only compatibility information between version 1.3 of the data schema and other respective versions of the data schema is obtained. Then, compatibility information between versions 1.0, 1.1, 1.2 and 1.3 of the data schemas, or compatibility information between version 1.3 of the data schema and other respective versions of the data schema, is sent.

Next, optionally, in step 210, data that successfully passes through compatibility verification is received, wherein the compatibility verification is performed on the data by the terminal device using the received compatibility information between different versions of the data schemas. After the terminal device receives compatibility information between different versions of data schemas relevant to the data schema version information, it uses this information to perform compatibility verification on data to synchronize and send data that successfully passes through compatibility verification to the synchronization server. The data that successfully passes through compatibility verification may only include a data record, and may also include the data record and data schema version information while the data record is processed.

Then, in step 212, method 200 ends.

Optionally, the method for data synchronization according to an embodiment of the disclosure may also include recording the compatibility information between different versions of data schemas. By means of an example of XML, the data structure of Table 1 may be utilized to record and maintain the compatibility information between different versions of data schemas in the synchronization server. The meaning of the respective fields in Table 1 is described in Table 2-1 and Table 2-2.

For example, the data structure may be utilized to record the compatibility information between different versions of data schemas as follows:

TABLE 1

Data structure for maintaining the compatibility information between data schemas in the synchronization server

| XS | Version | PrevVersion | Compatible |
|---|---|---|---|
| XML | 1.3 | 1.2 | Yes |
| XML | 1.3 | 1.1 | Yes |
| XML | 1.3 | 1.0 | No |

Taking Table 1 as example, it indicates that the current version of XML data schema is 1.3, and indicates the compatibility information between the current XML data schema (XML data schema version 1.3) and the previous versions of XML data schemas (XML data schema versions 1.0, 1.1 and 1.2).

The data structure of Table 1 is only an exemplary data structure, and those skilled in the art may utilize any other data structure to record and maintain the compatibility information between data schemas.

TABLE 2-1

Meaning of fields in data structure for maintaining the compatibility information between data schemas in the synchronization server

| Field Name | Data type | Description |
|---|---|---|
| XS | XML | XML data schema |
| Version | Char | Current version of XML data schema |

TABLE 2-2

Meaning of fields in data structure for maintaining the compatibility information between data schemas in the synchronization server

| Field Name | Data type | Description |
|---|---|---|
| PrevVersion | Char | Previous version of XML data schema |
| Compatible | Char | compatibility information between XML data schemas, indicate the compatibility information between the current version of XML data schema and the previous versions of XML data schemas |

Figure 3:
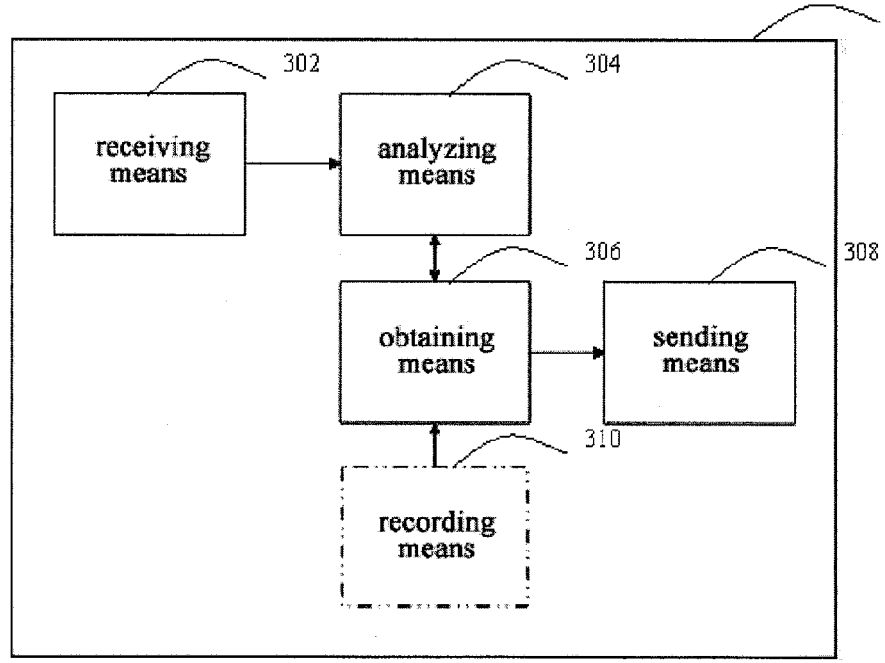
FIG. 3 shows a system 300 for data synchronization according to an embodiment of the disclosure.

A system 300 for data synchronization according to another embodiment of the invention will be described in detail below with reference to FIG. 3. As shown in FIG. 3, the system 300 for data synchronization according to this embodiment includes: receiving means 302 configured to receive data sent by a terminal device that includes at least corresponding data schema version information while the terminal device processes a data record; analyzing means 304 configured to analyze the received data to obtain the data schema version information; obtaining means 306 configured to obtain compatibility information between different versions of the data schemas relevant to the data schema version information, in which optionally, the compatibility information between different versions of data schemas includes at least the compatibility information between the current version of data schema and the previous version of data schema in a synchronization server; and sending means 308 configured to send the compatibility information between different versions of data schemas. Optionally, the receiving means is further configured to receive data that successfully passes through compatibility verification, wherein the compatibility verification is performed by the terminal device. Optionally, the system 300 for data synchronization according to another embodiment of the disclosure further includes: recording means 310 configured to record the compatibility information between different versions of data schemas. The system 300 for data synchronization may be embodied as a software application, or as a combination of software and hardware.

Figure 4:
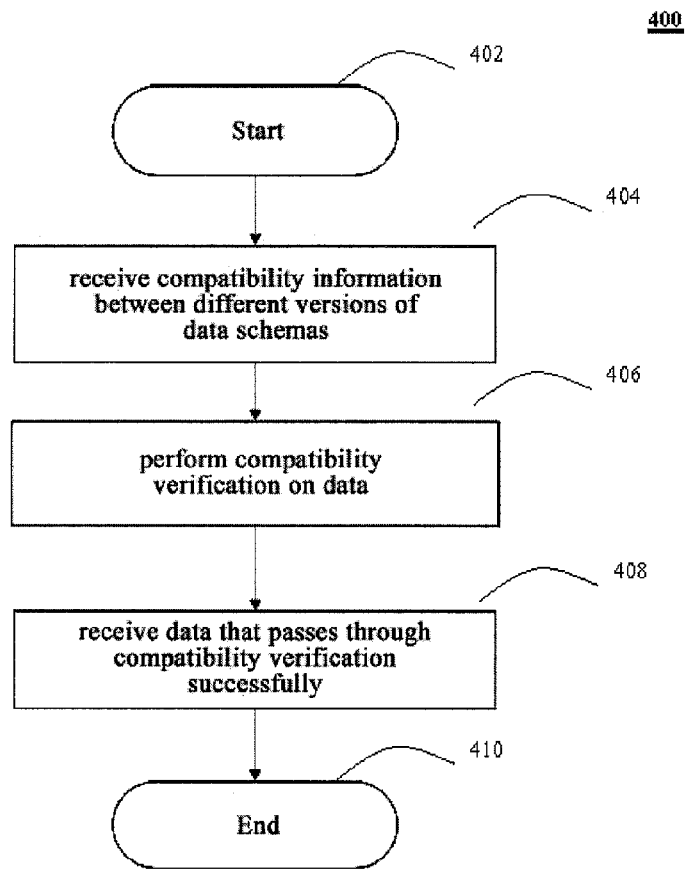
FIG. 4 shows a method 400 for performing data synchronization by a terminal device according to another embodiment of the disclosure.

With reference to FIG. 4, a method 400 for performing data synchronization by a terminal device according to another embodiment of the invention is shown. The method is typically performed in the terminal device. The method 400 for performing data synchronization by the terminal device according to this embodiment begins at step 402. Next, in step 404, compatibility information between different versions of data schemas is received. Then, method 400 proceeds to step 406, in which verification on data is performed by utilizing the received compatibility information between different versions of data schemas. Next, in step 408, data that successfully passes through compatibility verification is sent. The data that successfully passes through compatibility verification may only include a data record, and may also include the data record and data schema version information while the data record is processed. Then, method 400 ends in step 410.

By means of an example of XML, the data structure of Table 3 may be utilized to store data schema version information of data in a terminal device. The meanings of the fields are described in Table 4. The terminal device verifies data by utilizing compatibility information between different versions of data schemas received from a synchronization server according to information in the data structure of Table 3.

TABLE 3

Data structure for verifying data schema version information of data in the terminal device

| XDoc | Dirty | XS | Version |
|---|---|---|---|
| XML | Yes | XML | 1.3 |

TABLE 4

Meaning of fields in the data structure for verifying data schema version information of data in the terminal device

| Field Name | Data type | Description |
|---|---|---|
| XDoc | XML | Indicate XML file in the terminal device |
| Dirty | Integer | Synchronization indicator, indicates whether the data record has already been synchronized with data in the central database via the synchronization server |
| XS | XML | XML data schema |
| Version | Char | Version information of XML data schema, indicates which version in XML data schemas should be used to verify XML file |

The data structure of Table 3 is only an exemplary data structure, and those skilled in the art may utilize any other data structure to store this information.

Taking Table 3 as example, information therein indicates that a file in a terminal device is an XML file, and that the version of the corresponding current XML data schema is 1.3, i.e. version 1.3 of data schema will be used to verify non-synchronization data records in a terminal device. Utilizing information in Table 3, and incorporating the compatibility information between different versions of data schemas in Table 1, the terminal device performs compatibility verification on data before the data synchronization is performed. For instance, information of Table 1 represents that version 1.3 of the data schema is not compatible with version 1.0 of the data schema, and a certain entry of data record will not pass through compatibility verification performed by the terminal device if a corresponding version of the data schema is 1.0 when this entry data record is processed.

Figure 5:
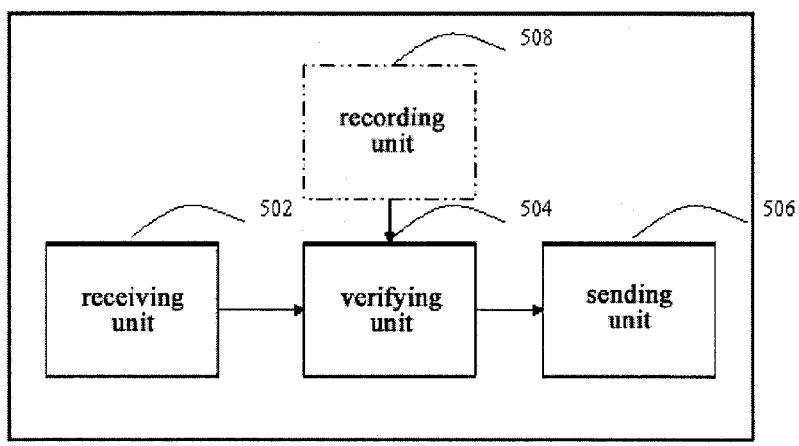
FIG. 5 shows a system 500 for performing data synchronization by a terminal device according to another embodiment of the disclosure.

An apparatus 500 apparatus for performing data synchronization by a terminal device according to another embodiment of the invention will be described in detail below with reference to FIG. 5. The apparatus 500 for performing data synchronization by a terminal device according to this embodiment includes: receiving unit 502 for receiving compatibility information between different versions of data schemas; verifying unit 504 for performing compatibility verification on data by utilizing the received compatibility information between different versions of data schemas; and sending unit 506 for sending data that successfully passes through compatibility verification. The data that successfully passes through compatibility verification may only include a data record, and may also include the data record and data schema version information while the data record is processed. Optionally, the apparatus 500 for performing data synchronization by the terminal device according to another embodiment of the disclosure further includes recording unit 508 for recording data schema version information in data.

Figure 6:
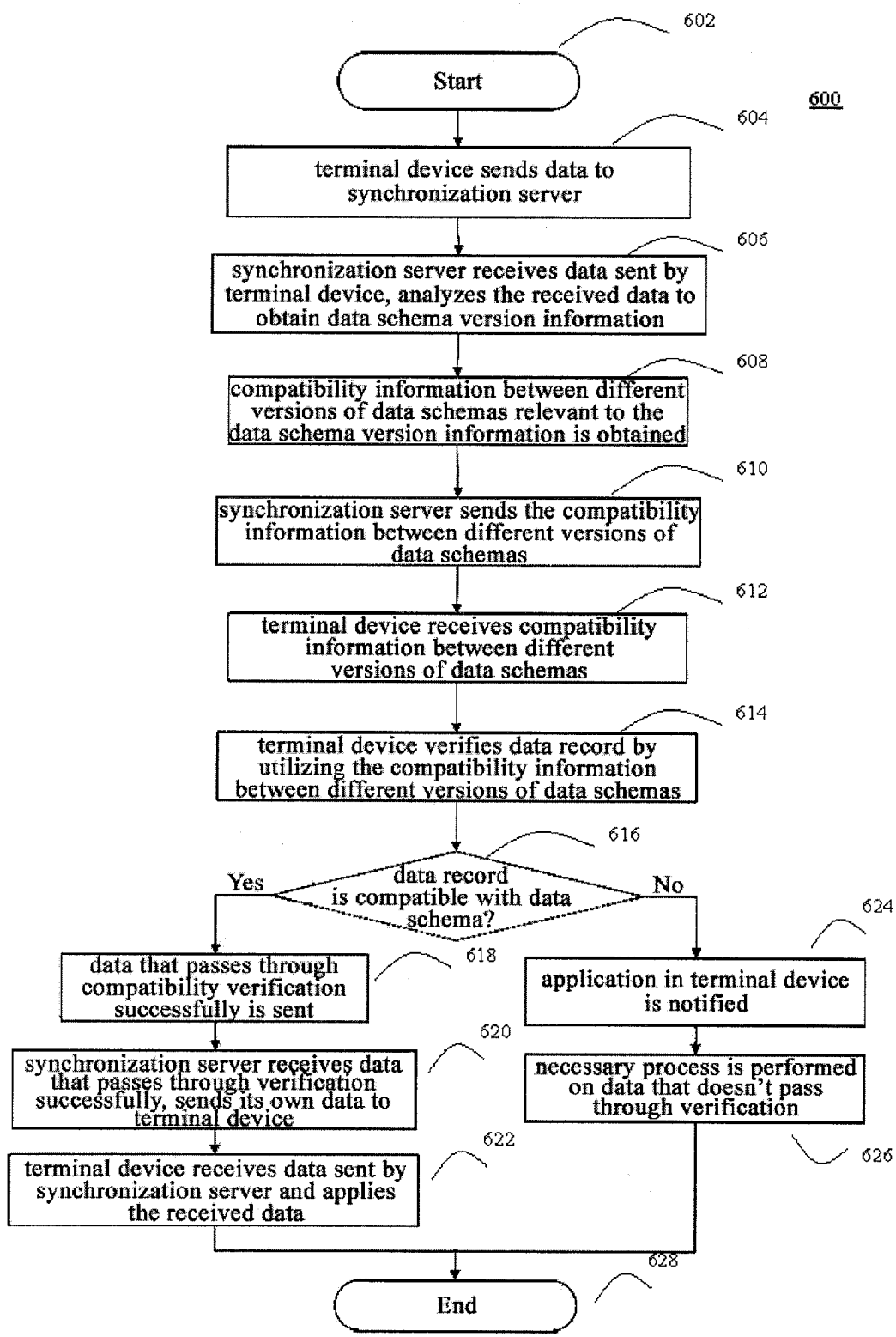
FIG. 6 shows a process 600 of data synchronization according to an embodiment of the disclosure.

With reference now to FIG. 6, a process 600 of data synchronization according to an embodiment of the invention is shown. The process is divided into two phases, in which steps 602 through steps 610 is a data schema synchronization phase, during which time the synchronization server sends compatibility information between different versions of data schemas relevant to the data schema version information recorded in the above data by analyzing data sent by a terminal device that includes at least corresponding data schema version information while the terminal device processes a data record, thereby achieving a synchronization with the terminal device data schema. Steps 610 through steps 626 are a data synchronization phase, during which time the terminal device performs compatibility verification on non-synchronization data by utilizing the received compatibility information between data schemas, thereby sending data that successfully passes through compatibility verification. The process of FIG. 6 is described in detail below.

The process of FIG. 6 begins at step 602. Next, in step 604, the terminal device sends data, that includes at least corresponding data schema version information while the terminal device processes a data record, to a synchronization server. For instance, such data may include only corresponding data schema version information while the terminal device processes the data record. Also, it may include a result of modification to a local copy of source data located in the terminal device by a user of the terminal device, which includes the processing with respect to the data record, and corresponding data schema version information while the terminal device processes the data record; possibly, it may include the addition or deletion of the data record, or modification to a value of the data record. The data schema version information includes corresponding data schema version information while the data record is processed. Then, in step 606, the synchronization server receives data sent by the terminal device, and analyzes the received data to obtain data schema version information. Next, in step 608, the synchronization server obtains compatibility information between different versions of data schemas relevant to the data schema version information, in which, optionally, compatibility information between different versions of data schemas include at least the compatibility information between a current version of data schema and a previous version of data schema in the synchronization server. Thereafter, in step 610, the synchronization server sends the obtained compatibility information between different versions of data schemas. The data schema synchronization phase ends.

Then, in step 612, the terminal device receives compatibility information between different versions of data schemas sent by the synchronization server. Next, in step 614, the terminal device performs verification on data by utilizing the received compatibility information between different versions of data schemas. Thereafter, in step 616, by utilizing the received compatibility information between different versions of data schemas, corresponding data schema version information is compared with data schema of the synchronization server (i.e. data schema sent by the synchronization server) to determine whether they are compatible, while each entry of non-synchronization data record is processed. If they are compatible, the process proceeds to step 618, during which the terminal device sends data that successfully passes through compatibility verification to the synchronization server, and data that successfully passes through compatibility verification may only include a data record, and may also include a data record and data schema version information while the data record is processed. Then, in step 620, the synchronization server receives data that successfully passes through compatibility verification, and sends its data to the terminal device. Next, in step 622, the terminal device receives and applies data sent by the synchronization server. If it is determined that they are not compatible in step 616, the process proceeds to step 624, during which an application in the terminal device is notified. Then, in step 626, the terminal device performs necessary processing on data that does not successfully pass through compatibility verification; for example, the data may be discarded or modified as the data that is compatible with the data schema of the synchronization server. After compatibility verification on all non-synchronization data record is completed, the process proceeds to step 628 and ends.

The process of data synchronization is described in detail above with reference to FIG. 6; however those skilled in the art will appreciate that this is only intended as an illustration. The specific technical solution should not be limited due to the detailed description of FIG. 6.

The basic principle is described above by incorporating specific embodiments; however, it should be noted that those skilled in the art can appreciate that all methods and apparatuses of the disclosure or any step or means may be implemented in any computing means (including processor, storage medium, etc) or network of computer means in hardware, firmware, software, or a combination of them, and this can be achieved by those skilled in the art after reading the description of the invention using basic programming skills.

Thus, the invention may be implemented by running a program or a set of programs on any computing means. The computing means may be known general means. Thus, the invention may be implemented by providing a program product which contains program codes for implementing the method or apparatus only. That is, such program product can constitute a storage medium in which such program product is stored. Obviously, the storage medium may be any known storage medium or any storage medium that will be developed in future.

It will be noted that, in the apparatus, method and computer program product of the invention, obviously, a respective means and step can be decomposed and/or recombined. Such decomposition and/or recombination should be viewed as an equivalent solution of the invention. Further, steps for performing a series of processes above may be performed according to the mentioned order naturally in time sequence, but not necessarily in time sequence. Some steps may be performed in parallel or independently.

Although the invention and its benefits have been described in detail, it should be appreciated that various modifications, replacements and changes may be made without departing from the spirit and scope defined by the appended claims.

Further, terms herein of "including", "containing" or any other variants are intended to encompass inclusion non-exclusively; thus process, method, article or means containing a series of elements include not only those elements, but others not listed explicitly, and those inherent to such process, method, article or means. Without further limitation, elements that are defined by phrases "including a . . . " do not exclude other elements that exist in the process, method, article or means of the elements.

What is claimed is:

1. A method for performing data synchronization by a terminal device, including:
    reception by the terminal device of compatibility information between different versions of data schemas including a current version of data schema and multiple previous versions of the current version of data schema;
    reception by the terminal device of current data with the current version of data schema;
    performing compatibility verification on the current version of data schema by comparing compatibility information between the current version of data schema and the multiple previous versions of the current version of data schema;
    performing compatibility verification of the data in the current version of data schema and the data in the multiple previous versions of the current version of data schema subsequent to the performing compatibility verification on the current version of data schema; and
    using the terminal device to send data that successfully passes through the compatibility verification of the data in the current version of data schema to a synchronization server; and
    in response to incompatibility of the current data with the multiple previous versions of the current version of data schema,
        selecting a previous version of data that is compatible with the multiple previous versions of the current version of data schema; and
        modifying the current data to be similar to a selected previous version of data that is compatible with the multiple previous versions of the current version of data schema.

2. The method according to claim 1, further, including:
    receiving data sent by the terminal device that includes at least version information of the current version of data schema while the terminal device processes a data record.

3. The method according to claim 1, further including:
    comparing version information of the current version of data schema with data schema of a synchronization server to determine whether they are compatible.

4. The method according to claim 1, wherein:
    the compatibility verification is performed on the data by the terminal device utilizing the received compatibility information between different versions of data schemas.

5. The method according to claim 1, further including:
    performing processing on data that does not successfully pass through compatibility verification.

6. The method according to claim 1, wherein:
    the compatibility information between different versions of data schemas includes at least compatibility information between the current version of data schema and one of the multiple previous versions of the current version of data schema in a synchronization server.

7. The method according to claim 1, wherein:
    the data is XML data; and
    the data schema is XML data schema.

8. A non-transitory computer storage medium having a computer program product for data synchronization, the computer program product comprising computer readable program code configured to:
    receive compatibility information between multiple previous versions of data schemas;
    perform compatibility verification on the multiple previous versions of data schemas by utilizing received compatibility information between the multiple previous versions of data schemas;
    perform compatibility verification on first data in the multiple previous versions of data schemas subsequent to performing verification on the multiple previous versions of data schemas by utilizing received compatibility information between the multiple previous versions of data schemas;
    use the terminal device to send data that successfully passes through the compatibility verification to a synchronization server; and
    in response to incompatibility of current data with the multiple previous versions of data schemas,
        select a different previous version of the first data that is compatible with the multiple previous versions of data schemas, and
        modify the current data to be similar to the selected different previous version of the first data that is compatible with the multiple previous versions of data schemas.

9. The computer program product according to claim 8, further including:
    computer readable program code configured to receive data sent by the terminal device that includes at least corresponding data schema version information while the terminal device processes a data record.

10. The computer program product according to claim 8, further including:
    computer readable program code configured to compare data schema version information for one of the multiple previous versions of data schemas with data schema of a synchronization server to determine whether they are compatible.

11. The computer program product according to claim 8, further including:
    computer readable program code configured to perform processing on data that does not successfully pass through compatibility verification.

12. The computer program product according to claim 8, wherein:
    the compatibility verification is performed on the data by the terminal device utilizing the received compatibility information between multiple previous versions of data schemas.

13. The computer program product according to claim 8, wherein:
    the compatibility information between multiple previous versions of data schemas includes at least compatibility information between a current version of a data schema and a previous version of a data schema in a synchronization server.

14. The computer program product according to claim 8, wherein:
    the data is XML data; and
    the data schema is XML data schema.

15. An apparatus for performing data synchronization by a terminal device, including:
    a receiving unit configured to receive compatibility information between different versions of data schemas;

a verifying unit configured to perform compatibility verification on multiple versions of the data schemas including multiple previous versions of the data schemas by utilizing received compatibility information between different versions of the data schemas; and
a sending unit configured to use the terminal device to send data that successfully passes through compatibility verification to a synchronization server,
wherein the verifying unit is configured to:
   perform compatibility verification on data in the multiple versions of the data schemas subsequent to performing compatibility verification on the multiple versions of the data schemas;
   in response to incompatibility of current data with the previous versions of data schemas,
   select a different version of data that is compatible with the previous versions of data schemas; and
   modify the current data to be similar to the selected different version of data that is compatible with the previous versions of the data schemas.

16. The apparatus according to claim 15, further including:
a recording unit configured to record data schema version information in data.

17. The apparatus according to claim 15, wherein the receiving unit:
receives data sent by a terminal device that includes at least corresponding data schema version information while the terminal device processes a data record.

18. The apparatus according to claim 15, wherein the verifying unit:
compares corresponding data schema version information with data schema of a synchronization server to determine whether they are compatible.

19. The apparatus according to claim 15, wherein the verifying unit:
performs processing on data that does not successfully pass through compatibility verification.

* * * * *